May 13, 1969  L. G. LAKIN  3,443,300
ROLL CONSTRUCTION
Filed Jan. 4, 1967
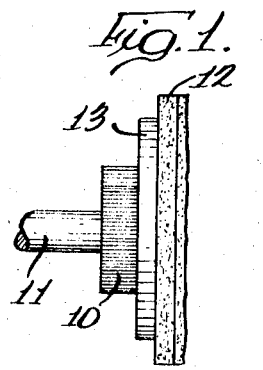
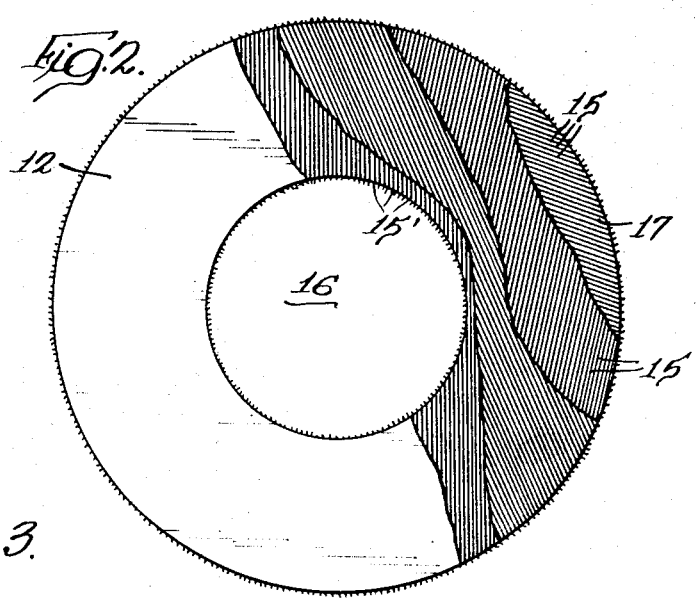
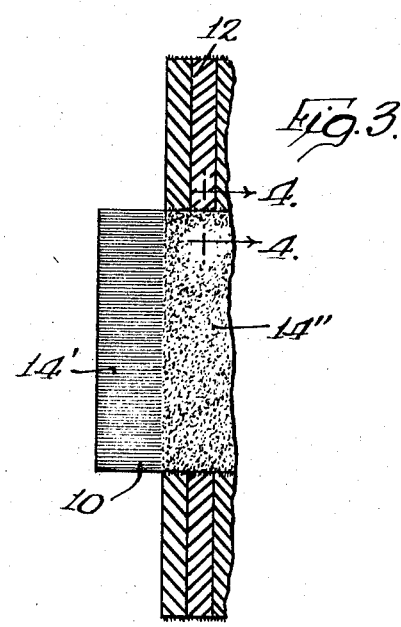
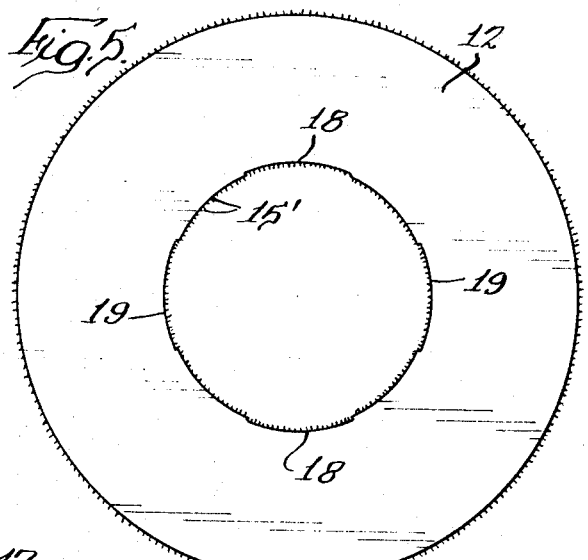
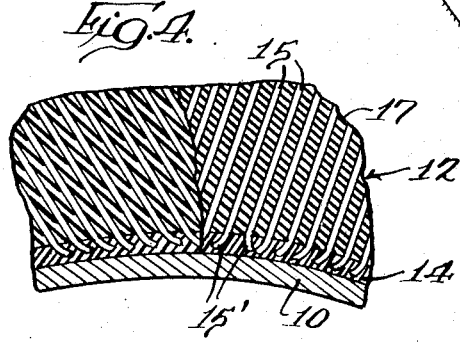
Inventor:
Lewis G. Lakin
By
Gary, Parker, Juettner & Cullinan
Attys 3,443,300
ROLL CONSTRUCTION
Lewis G. Lakin, Chicago, Ill., assignor to A. Lakin & Sons, Inc., Chicago, Ill., a corporation of Illinois
Filed Jan. 4, 1967, Ser. No. 607,273
Int. Cl. B21b 27/00
U.S. Cl. 29—125                                         1 Claim

ABSTRACT OF THE DISCLOSURE

A roll comprising a rigid elongated cylindrical core and a plurality of relatively flexible resilient annular discs carried by said core under axial compression, said discs being composed of a plurality of plies of rubber impregnated cord fabric, the fabric plies being disposed in face-to-face relationship with the cords of adjacent plies being disposed on a bias to each other, cord ends projecting from the inner periphery of said discs, and adhesive interposed between said core and said discs anchoring the latter against rotational displacement. As an aid to such anchoring, the inner periphery of the discs can be formed with a plurality of shallow arcuate notches.

---

The present invention relates to improvements in roll construction of the class wherein a plurality of axially apertured discs of fabric-reinforced flexible resilient material are mounted on an elongated shaft under compression in a direction axial to the shaft.

Rollers of this nature are suitable for a wide variety of uses, depending on their length and diameter and may be used singly or in pairs in combination with like rollers or with relatively rigid metal rollers in fixed or mobile installations. Typical uses of rollers herein contemplated are hay conditioning rolls, husking rolls, bale ejector rolls, leveling rollers, pulley drive and idler rolls, castor and other wheels, lawn mower rolls, and the like.

As is well known, the discs employed in making rolls of the class herein contemplated are for economical reasons formed of used fabric-reinforced rubber compositions such as belting, particularly tire casings. In the alternative, they may be newly formed of a plurality of plies of rubber impregnated cord fabric, the fabric plies being disposed in face-to-face relationship with the cores of adjacent plies being disposed on a bias to each other, and the discs formed with an axial opening so that they may be mounted on a shaft or core.

As shown by my U.S. Patent No. 3,054,163 and others, the discs are engaged to the shaft or core in a manner adapted to inhibit or prevent rotation of the individual discs under torsional stress in use. In some instances, inhibition of rotation of the individual discs has been accomplished by using a shaft or core of angular cross-section, such as for example a square cross-section with matching square axial apertures in the discs. In other instances, inhibition against rotation of the individual discs is accomplished by securing keys say for example a pair of diametrically opposed keys extending longitudinally of the cylindrical shaft or core, with matching pairs of keyways opening to annular openings in said discs.

However, in cases of severe and extended usage the prior practices have at times been found to be inadequate to prevent rotation of the discs on the shaft and it is therefore an object of the present invention to provide an improved means for preventing rotation of the discs on the shaft.

Thus, in accordance with the present invention in lieu of providing angular shafts and angular axial openings in the discs, or in lieu of providing the shaft with keys and the discs with keyways, I adhesively bond discs formed with annular openings to cylindrical shafts or cores and have found that this arrangement is superior to the prior practices. It will be understood that this superiority is obtained only when the discs are fabric-reinforced in the manner aforesaid as distinguished from, for example, molded rolls or discs composed of rubber with fibers disposed therein in a heterogeneous arrangement. The reason for this is that in die cutting the annular openings in the material from which the discs are made it has been found that cord ends substantially free of rubber remain and project from the inner periphery of the disc resulting somewhat in the effect of a rubber based brush. Thus, when adhesive is applied to the shaft or core by brushing or spraying it thereon and drawing the discs thereover, it has been found that the adhesive projects into the brush-like inner periphery of the disc and forms a strong interlocking engagement highly resistant to rotational displacement of the discs as will hereinafter be more fully shown and described.

The objects and advantages of the present invention, its details of construction and arrangement of parts, and other advantages and economies thereof will be apparent from a consideration of the following detailed description and the accompanying drawings, a brief description of the drawings being as follows:

FIG. 1 is a fragmentary end view of a roll constructed in accordance with the present invention.

FIG. 2 is a plan view of one of the component fabric-reinforced rubber discs employed in the present invention with parts broken away.

FIG. 3 is a fragmentary view partly in section of an end of a shaft or core, with a section through several of the discs mounted thereon and illustrating the arrangement of the adhesive which locks the two together.

FIG. 4 is a section on the line 4—4 of FIG. 3.

FIG. 5 is a plan view of a disc similar to that of FIG. 2 of modified construction.

Referring to the drawings, reference numeral 10 designates a shaft, or preferably a hollow metal core to which there is engaged a stub shaft 11 for mounting the roll on suitable apparatus where it is to be employed. The core 10 has mounted thereon a plurality of discs 12 of the character hereinbefore described and under axial compression between a pair of opposed plates 13, only one of which is shown, in conventional manner or as is apparent from my aforementioned patent and others. Thus the discs 12 are composed of a plurality of rubber impregnated plies of cord fabric, the cords 15 being composed of twisted parallel strands of fibers such as nylon, rayon, cotton and the like, and the plies are arranged at an angle to each other as illustrated in FIG. 2 so that the component cords 15 of one ply extend at an angle to the cords 15 of another ply. When the discs 12 are peripherally trimmed and each formed with an axial annulus by die cutting, this results in protrusion of cord ends 15' projecting within the annulus 16 substantially radially from the periphery of the defines of the annulus 16 to provide a brush effect, i.e. a plurality of fabric cord ends 15' projecting from the rubber matrix 17.

In the practice of the present invention, adhesive 14 is interposed between the inner periphery of the axial annular opening generally designated as 16, whereat cord fabric ends 15' protrude. The annulus 16 is generally cut to a diameter smaller than that of the core 10, say for example of a diameter of .100 to .120 less than the diameter of cord 10. Even though it would appear that when one threads the discs 12 on the core 10, which has been previously sprayed or brushed with adhesive 14, the adhesive 14 would be wiped away, such is not the case as is evidenced by the fact that striations or streaks of adhesive 14' are visibly left on the core after the discs are assembled thereon. This is due to the projection of the cord ends 15' from the inner periphery of the roll 12 and thus the adhesive not only bonds to the metal core 10 but also to the rubber and fabric ends 15' of the discs 12 to form a strong and continuous interlock about the surface of the cylindrical core 10. This interlock is further evidenced by the stippled residue of adhesive 14" as shown in FIG. 3 when the discs 12 are broken or cut away. The adhesive employed can be of a conventional commercial nature such as will harden or set in cold, i.e. ambient or room temperature, one example of which is epoxy resin.

The locking effect between the metal roll 10, the fabric-reinforced rubber discs 12 and the adhesive 14 can be enhanced if desired and if considered necessary by providing the inner periphery of the discs 12 with one or more pairs of arcuate notches such as at 18, 18 and 19, 19. These notches need be only of a depth of .030 to 1/16 inch, and depending on the diameter of the disc and its inner annulus these notches can be of from about 1 to about 2 inches in length. This provides an added anchor in addition to the anchor formed in the areas between these notches.

I claim:
1. A roll comprising a rigid elongated cylindrical core and a plurality of relatively flexible resilient annular discs carried by said core under axial compression thereon, said discs being composed of a plurality of plies of rubber impregnated cord fabric, the plies being disposed in face-to-face relationship with the cords of adjacent plies being disposed on a bias to each other, cord ends projecting from the inner periphery of said discs, and adhesive interposed between said core and said discs anchoring the latter against rotational displacement, the inner periphery of the discs being formed with a plurality of shallow arcuate notches, the adhesive extending into said notches.

References Cited
UNITED STATES PATENTS

| | | | |
|---|---|---|---|
| 699,474 | 5/1902 | Beasley | 15—179 |
| 2,801,461 | 8/1957 | Küsters | 29—125 X |
| 2,878,778 | 3/1959 | Küsters | 29—125 X |
| 3,111,742 | 11/1963 | Lakin | 29—125 |

BILLY J. WILHITE, *Primary Examiner.*